(12) United States Patent
Murata et al.

(10) Patent No.: US 8,860,916 B2
(45) Date of Patent: Oct. 14, 2014

(54) LIQUID CRYSTAL DISPLAY DEVICE

(75) Inventors: Mitsuhiro Murata, Osaka (JP); Shoichi Ishihara, Osaka (JP); Takehisa Sakurai, Osaka (JP); Shuichi Kozaki, Osaka (JP); Toshihiro Matsumoto, Osaka (JP); Yosuke Iwata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 56 days.

(21) Appl. No.: 13/521,110

(22) PCT Filed: Oct. 28, 2010

(86) PCT No.: PCT/JP2010/069199
§ 371 (c)(1),
(2), (4) Date: Apr. 15, 2013

(87) PCT Pub. No.: WO2011/083616
PCT Pub. Date: Jul. 14, 2011

(65) Prior Publication Data
US 2013/0201434 A1    Aug. 8, 2013

(30) Foreign Application Priority Data

Jan. 8, 2010  (JE) .................. 2010-003218

(51) Int. Cl.
| | | |
|---|---|---|
| G02F 1/1343 | (2006.01) | |
| G02F 1/139 | (2006.01) | |
| G02F 1/1362 | (2006.01) | |
| G02F 1/137 | (2006.01) | |
| G02F 1/1337 | (2006.01) | |

(52) U.S. Cl.
CPC ..... *G02F 1/134309* (2013.01); *G02F 2001/13706* (2013.01); *G02F 1/1395* (2013.01); *G02F 1/136286* (2013.01); *G02F 2001/133742* (2013.01); *G02F 1/134363* (2013.01)
USPC ........................................................ 349/141

(58) Field of Classification Search
None
See application file for complete search history.

(56) References Cited

U.S. PATENT DOCUMENTS

| | | |
|---|---|---|
| 6,181,402 B1 | 1/2001 | Shim et al. |
| 6,222,599 B1 | 4/2001 | Yoshida et al. |

(Continued)

FOREIGN PATENT DOCUMENTS

JP     10-333171    12/1998

(Continued)

OTHER PUBLICATIONS

International Search Report for PCT/JP2010/069199 mailed Dec. 14, 2010.

*Primary Examiner* — Richard Kim
(74) *Attorney, Agent, or Firm* — Nixon & Vanderhye P.C.

(57) ABSTRACT

The present invention provides a liquid crystal display device capable of preventing occurrence of flickers. The liquid crystal display device including a first substrate and a second substrate disposed to face each other, and a liquid crystal layer sandwiched between the first substrate and the second substrate, wherein the liquid crystal layer includes a liquid crystal molecule having positive dielectric anisotropy; the liquid crystal molecule is perpendicularly aligned relative to a surface of the first substrate when no voltage is applied; the first substrate includes a pixel electrode to which an image signal is supplied, a common electrode to which a common signal is supplied, an insulating film, and a lower layer wiring connected to the pixel electrode; the lower layer wiring, the insulating film, and the common electrode are stacked in the stated order towards the liquid crystal layer side; the image signal is supplied to the pixel electrode through the lower wiring; the pixel electrode has a pixel comb-tooth portion; the common electrode has a common comb-tooth portion; the pixel comb-tooth portion and the common comb-tooth portion are planarly disposed to face each other in a pixel; the liquid crystal device has at least two regions having spacings of different lengths between the pixel electrode and the common electrode from each other in the pixel; the lower layer wiring overlaps the common comb-tooth portion and extends along the common comb-tooth portion; and a width of a part of the lower layer wiring which is overlapped with the common comb-tooth portion is substantially the same as or smaller than a width of a part of the common comb-tooth portion which is overlapped with the lower layer wiring.

3 Claims, 9 Drawing Sheets

(56) References Cited

U.S. PATENT DOCUMENTS

| | | |
|---|---|---|
| 6,642,984 B1 | 11/2003 | Yoshida et al. |
| 6,704,083 B1 | 3/2004 | Kim et al. |
| 2001/0010575 A1 | 8/2001 | Yoshida et al. |
| 2002/0154262 A1* | 10/2002 | Yamakita et al. ............. 349/141 |
| 2003/0197824 A1 | 10/2003 | Shim et al. |
| 2004/0066480 A1 | 4/2004 | Yoshida et al. |
| 2004/0114084 A1 | 6/2004 | Kim et al. |
| 2005/0151911 A1 | 7/2005 | Kim et al. |
| 2005/0260359 A1 | 11/2005 | Kunimatsu |
| 2006/0050218 A1* | 3/2006 | Baek ............................ 349/141 |
| 2010/0315582 A1 | 12/2010 | Kim et al. |

FOREIGN PATENT DOCUMENTS

| | | |
|---|---|---|
| JP | 2000-81641 | 3/2000 |
| JP | 2000-305100 | 11/2000 |
| JP | 2002-139736 | 5/2002 |
| JP | 2004-54090 | 2/2004 |

* cited by examiner 230   220   203a   230

313   303a   320   330

LIQUID CRYSTAL DISPLAY DEVICE

This application is the U.S. national phase of International Application No. PCT/JP2010/069199 filed 28 Oct. 2010 which designated the U.S. and claims priority to JP 2010-003218 filed 8 Jan. 2010, the entire contents of each of which are hereby incorporated by reference.

TECHNICAL FIELD

The present invention relates to a liquid crystal display device. More specifically, the present invention relates to a liquid crystal display device that adopts an oblique electric field system.

BACKGROUND ART

Liquid crystal display devices are widely used in various fields by virtue of their thin profile, light weight and low power consumption. The display performance of liquid crystal display devices has improved significantly over the years, to the point of surpassing that of CRT (cathode ray tubes) displays.

The display mode in liquid crystal display devices is determined by the way in which a liquid crystal is arrayed within a cell. Conventionally known display modes in liquid crystal display devices include a vertical electric field system and a transverse electric field system. Known examples of the vertical electric field system include TN (twisted nematic) mode, MVA (multi-domain vertical alignment) mode, and OCB (optically self-compensated birefringence) mode. Known examples of the transverse electric system include IPS (in-plane switching) mode.

Liquid crystal display devices of TN mode are widely and generally used among the modes. Liquid crystal display devices of TN mode, however, have room for improvement in terms of shortcomings such as slow response and narrow viewing angle.

Meanwhile, in MVA mode, as shown in FIG. 12, slits 120a are provided in a pixel electrode of an active matrix substrate 101, and a protrusion (rib) 145 for controlling the alignment of liquid crystal molecules is provided in a counter electrode 142 of a counter substrate, thereby forming a fringe field. The alignment direction of the liquid crystal molecules is distributed in a plurality of directions by the fringe field. Namely, by forming a plurality of regions (multi-domain) where the direction in which the liquid crystal molecules fall upon voltage application is different from one another, a wide viewing angle is achieved. Directors 103a of the liquid crystal molecules are asymmetrically aligned relative to a center line between the slits 120a and the protrusion 145. Moreover, since MVA mode is a vertical alignment mode, liquid crystal display devices of MVA mode can achieve a higher contrast than liquid crystal display devices of TN mode, IPS mode, and OCB mode. However, MVA mode involves a complex production process, and like TN mode, has a slow response, leaving room for improvement.

In order to solve the problems concerning the production process of liquid crystal display device of MVA mode, for example, a liquid crystal display device has been described (for example, Patent Literature 1) which includes a first substrate and a second substrate facing each other; a liquid crystal material layer injected between the first substrate and the second substrate, the liquid crystal material layer containing liquid crystal molecules aligned in a direction perpendicular to the first substrate and the second substrate; and at least two electrodes formed in parallel with one another on one of the first substrate and the second substrate. In the above configuration, as shown in FIG. 13, a transverse electric field 250 is generated between an electrode 220 and an electrode 230 which are formed on one of the substrates, so that liquid crystal molecules that have been perpendicularly aligned upon application of no voltage are fallen in a horizontal direction by the transverse electric field 250. At this time, directors 203a of liquid crystal molecules are symmetrically aligned relative to the center line between the electrode 220 and the electrode 230. Since no alignment control by protrusions is required in this configuration, the pixel configuration is simple and viewing angle characteristics are superior.

Moreover, as a display system other than the above systems, an oblique electric field system is known. According to this system, a liquid crystal layer is driven by an electric field in a direction oblique to a substrate surface. Specifically, for example, a liquid crystal display device is known which includes a pair of substrates, a liquid crystal enclosed between the pair of substrates, a plurality of stripe electrodes per pixel formed on one of the substrates, and a transparent electrode formed on the other substrate to cover substantially the whole of the substrate. In the liquid crystal device, the plurality of stripe electrodes include a first group of stripe electrodes and a second group of stripe electrodes, the first group of electrodes and the second group of electrode being in parallel to one another, the first group of stripe electrodes receiving a first voltage, the second group of stripe electrodes receiving a second voltage that is different from the first voltage (see, for example, Patent Literature 2).

CITATION LIST

Patent Literature

[Patent Literature 1] JP-A 10-333171
[Patent Literature 2] JP-A 2000-305100

SUMMARY OF INVENTION

Technical Problem

Liquid crystal display devices have been demanded to have performances such as high contrast, high-speed response, and wide viewing angles. In order to develop liquid crystal display devices satisfying these demands, the inventors of the present invention focused their attention to an oblique electric field system.

Specifically, the present inventors have investigated a liquid crystal display device shown in FIG. 14. The liquid crystal display device includes a pair of substrates 301 and 302, and a liquid crystal layer 303 provided between the substrates 301 and 302.

The liquid crystal layer 303 includes a nematic liquid crystal material having positive dielectric anisotropy, and the liquid crystal molecules are perpendicularly aligned when no voltage is applied. Therefore, the liquid crystal display device has high contrast characteristics comparable to liquid crystal display devices of MVA mode.

On the substrate 301, a pixel electrode 320 and a common electrode 330 each having a comb-tooth portion are formed, and a transverse electric field is generated by the electrodes 320 and 330. A lower layer wiring (lower layer drain electrode) 313 is disposed under the common electrode 330 with an insulating layer 318 sandwiched therebetween. The lower layer wiring 313 is connected to the pixel electrode 320 via a contact hall provided in the insulating layer 318. The substrate 302 has a color filter layer 341, a solid electrode 342 that is formed to cover at least a display region, and a dielectric layer 343. For example, setting the potential of the solid electrode 342 to the same potential as that of the common electrode 330 generates an oblique electric field 350. Thus, directors 303a of the liquid crystal molecules are distributed symmetrically relative to the pixel electrode 320. The liquid crystal display device has a better viewing angle characteristic than liquid crystal display devices of VA-mode. Meanwhile, the transverse electric field generated by the electrodes 320 and 330 functions to facilitate generation of the oblique electric field 350.

Moreover, a multi-domain is easily provided by forming at least two regions which have different lines and spaces of the electrodes 320 and 330 from one another in a pixel.

Furthermore, a flow effect caused by the transverse electric field is given to the liquid crystal molecules, the liquid crystal display device has fast response characteristics.

However, the liquid crystal display device uses a liquid crystal material having a larger positive dielectric anisotropy than that normally used in liquid crystal display devices of other display systems. For this reason, as compared with liquid crystal display devices of other systems, the dielectric anisotropy $\Delta \in$ changes largely at high temperatures. Moreover, in the case of forming a multi-domain in a manner as mentioned earlier, the transmittance distribution under a normal temperature is different from that under a high temperature in some cases. In such cases, differences occur in the voltage (through-feed voltage: $\Delta Vd$) pulled in the lower layer wiring 313 between a domain near the lower layer wiring 313 and a domain away from the lower layer wiring 313. Thus, an optimal voltage to be applied to the common electrode may differ between the domains. As a result, flicker occurs in some cases.

The present invention has been made in view of the above circumstances, and an object of the present invention is to provide a liquid crystal display device capable of preventing occurrence of flickers.

Solution to Problem

The inventors of the present application have conducted various studies on a liquid crystal display device capable of preventing occurrence of flickers, and have focused their attention on a lower layer wiring. As a result, they have found that a through-feed voltage differs from one domain to another in the case where a lower layer wiring overlaps a common electrode, and also the width of the lower is larger than the width of the common electrode, thereby causing the aforementioned problems.

After further studies, the inventors of the present application have realized that changes in the transmittance distribution between at a normal temperature and at a high temperature can be prevented by setting the width of the part of the lower layer wiring which is overlapped with a comb-tooth portion (common comb-tooth portion) of the common electrode to substantially the same as or smaller than the width of the part of the common comb-tooth portion which is overlapped with the lower layer wiring. Having realized that this idea can beautifully solve the above problem, the inventors have completed the present invention.

Namely, the present invention provides a liquid crystal display device including a first substrate and a second substrate disposed to face each other, and a liquid crystal layer sandwiched between the first substrate and the second substrate, wherein the liquid crystal layer includes a liquid crystal molecule having positive dielectric anisotropy; the liquid crystal molecule is perpendicularly aligned relative to a surface of the first substrate when no voltage is applied; the first substrate includes a pixel electrode to which an image signal is supplied, a common electrode to which a common signal is supplied, an insulating film, and a lower layer wiring connected to the pixel electrode; the lower layer wiring, the insulating film, and the common electrode are stacked in the stated order towards the liquid crystal layer side;

the image signal is supplied to the pixel electrode through the lower wiring; the pixel electrode has a pixel comb-tooth portion; the common electrode has a common comb-tooth portion; the pixel comb-tooth portion and the common comb-tooth portion are planarly disposed to face each other in a pixel; the liquid crystal device has at least two regions having spacings of different lengths between the pixel electrode and the common electrode from each other in the pixel; the lower layer wiring overlaps the common comb-tooth portion and extends along the common comb-tooth portion; and a width of a part of the lower layer wiring which is overlapped with the common comb-tooth portion is substantially the same as or smaller than a width of a part of the common comb-tooth portion which is overlapped with the lower layer wiring.

Meanwhile, the term "perpendicularly aligned" used herein means that a pretilt angle is not necessarily exactly 90°, and the term may refer to substantially vertical alignment.

The display region includes a light-shielding region formed between pixels and/or in a pixel.

In the present invention, the pixel may be a picture element.

Moreover, in the present invention, the insulating film may be an interlayer insulating film.

The configuration of the liquid crystal display device of the present invention is not especially limited by other components as long as it essentially includes such components.

Advantageous Effects of Invention

In the liquid crystal display device of the present invention, flicker can be prevented from occurring.

DESCRIPTION OF EMBODIMENT

Figure 1:
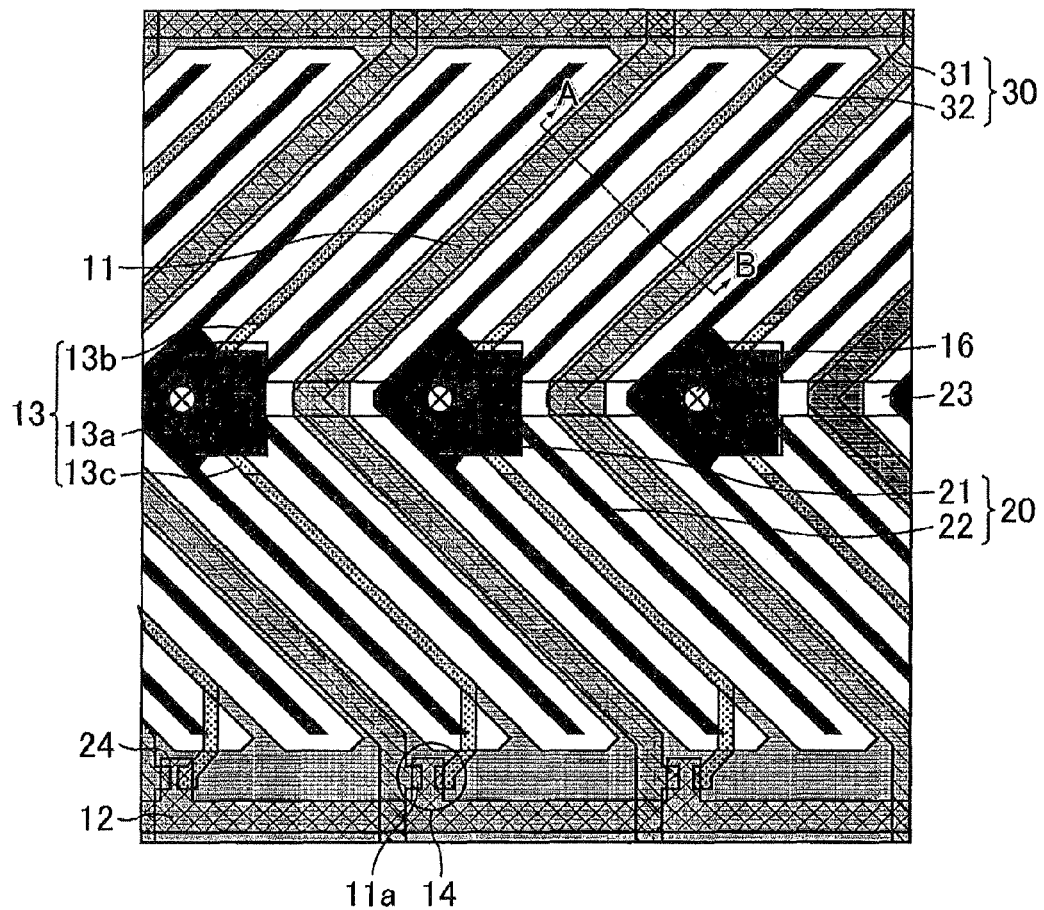
FIG. 1 is a planar schematic view showing a liquid crystal display device according to Embodiment 1.

The present invention will be mentioned in more detail referring to the drawings in the following embodiments, but is not limited to these embodiments.

In the embodiments below, the 3 o'clock direction, the 12 o'clock direction, the 9 o'clock direction and the 6 o'clock direction denote respectively a 0° direction (orientation), a 90° direction (orientation), a 180° direction (orientation) and a 270° direction (orientation); while the direction running through 3 o'clock and 9 o'clock is a left-right direction and the direction running through 12 o'clock to 6 o'clock is a top-down direction, in a front view of the liquid crystal display device, i.e. in a front view of surfaces of the active matrix substrate and the counter substrate.

Further, in the drawings below, although mainly several picture elements (subpixels) are shown, a plurality of pixels are provided in a matrix shape in a display region (region to display images) of the liquid crystal display device of each embodiment. Each pixel consists of a plurality (normally three pieces) of picture elements.

(Embodiment 1)

A liquid crystal display device according to the present embodiment displays image by generating an electric field in a direction oblique to a substrate surface so that the alignment of the liquid crystal molecules is controlled by the electric field.

Figure 2:
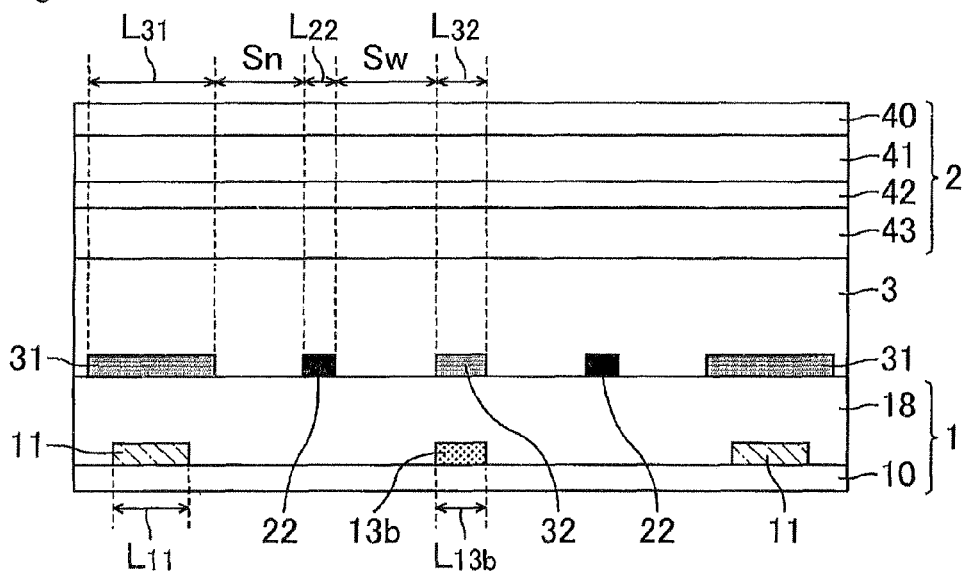
FIG. 2 is an A-B line cross-sectional view of FIG. 1.

The liquid crystal display device of the present embodiment includes a liquid crystal display panel. As shown in FIG. 2, the liquid crystal display panel has an active matrix substrate (TFT array substrate) 1 and a counter substrate 2 that are a pair of substrates disposed to face each other, and a liquid crystal layer 3 sandwiched between the substrates 1 and 2. The substrate 1 is disposed at a back side of the liquid crystal display device, and the substrate 2 is disposed at an observation side of the liquid crystal display device.

A pair of linear polarizers are provided at the opposite sides to the liquid crystal layer 3 of the substrates 1 and 2. The pair of linear polarizers are disposed in a cross-Nichol arrangement. An absorption axis of one of the pair of linear polarizers is arranged in an angle of 0°, and an absorption axis of the other of the pair of linear polarizers is arranged in an angle of 90°. An optical film such as a retardation film may be provided at least one of a position between the substrate 1 and one of the polarizers and a position between the substrate 2 and the other polarizer.

The substrates 1 and 2 are attached to each other with a sealing material provided so as to surround the display region. The substrates 1 and 2 are disposed to face each other through spacers such as plastic beads. The liquid crystal layer 3 is formed by filling a liquid crystal material as a display medium constituting an optical modulation layer in the gap between the substrates 1 and 2. Vertical alignment films are provided on the surfaces on the liquid crystal layer 3 sides of the substrates 1 and 2, respectively.

The liquid crystal layer 3 includes a nematic liquid crystal material that has positive dielectric anisotropy. Liquid crystal molecules (hereinafter, also referred to simply as nematic liquid crystal) of the material exhibit a homeotropic alignment when no voltage is applied thereto (when no electric field is generated by the three electrodes described later) under the effect of an alignment-regulating force of the vertical alignment films. Specifically, the pretilt angle of the liquid crystal layer 3 is not less than 86° (preferably not less than 88°). The pretilt angle of less than 86° may reduce the contrast (CR) by 20% or more.

Thus, since the liquid crystal display panel of the present embodiment has the pair of polarizers that are disposed in a cross-Nichol arrangement and the vertical-alignment type liquid crystal layer 3 as well, the liquid crystal display panel is of a normally black mode.

The vertical alignment films are formed by coating of a known alignment film material such as polyimide. Although the vertical alignment films are normally not subjected to a rubbing treatment, the vertical alignment films can align nematic liquid crystal in substantially a perpendicular direction relative to the film surface when no voltage is applied.

Panel retardation $d\Delta n$ (the product of a cell thickness d and a birefringence index $\Delta n$ of the liquid crystal material) is 280 to 480 nm (preferably 320 to 360 nm). The panel retardation exceeding 480 nm may extremely deteriorate the viewing angle. The panel retardation of less than 280 nm may greatly reduce the transmittance.

The cell thickness d is 2.8 to 3.8 μm (preferably 3 to 3.5 μm). The cell thickness d exceeding 3.8 μm may extremely deteriorate the viewing angle. The cell thickness of less than 3 μm may greatly reduce the transmittance.

The birefringence index $\Delta n$ of the liquid crystal material at 25° C. is 0.08 to 0.13.

The birefringence index $\Delta n$ of the liquid crystal material at 60° C. is 0.06 to 0.11.

The dielectric constant $\Delta \in$ of the liquid crystal material at 25° C. is 15 to 25 (preferably 18 to 22). The dielectric constant $\Delta \in$ exceeding 25 may cause delay in response. The dielectric constant $\Delta \in$ of less than 15 may reduce the transmittance.

The counter substrate 2 includes a colorless transparent insulating substrate 40 formed from glass, plastic, or the like. On a main surface on the liquid crystal layer 3 side of the insulating substrate 40, a color filter layer 41, a solid electrode 42 (counter electrode), a dielectric layer (insulating layer) 43, and the vertical alignment film are formed thereon in the stated order.

The color filter layer 41 includes a plurality of color layers (color filters) provided corresponding to respective picture elements. The color layers are used for color image display. The color layers are formed of a transparent organic insulating film or the like such as an acrylic resin that contains a pigment, and are mainly formed on picture element regions. This configuration enables color display. Each pixel is constituted by three picture elements that respectively output colored light of, for example, R (red), G (green) and B (blue). Note that the types and number of colors of the picture elements constituting each pixel are not particularly limited, and may be set appropriately. Namely, each pixel may be constituted by, for example, picture elements of three colors such as cyan, magenta, and yellow, or may be constituted by picture elements of four or more colors.

The color filter layer 41 may further include a black matrix (BM) layer which blocks light between each of the picture elements. The BM layer may be formed of an opaque metal film of chrome or the like, or an opaque organic film of acrylic resin containing carbon or the like. The BM layer is formed in a region corresponding to a boundary region of adjacent picture elements.

The solid electrode 42 is formed of a transparent conductive film such as an ITO film and an IZO film. The solid electrode 42, the dielectric layer 43, and the vertical alignment film 44 are formed without breaks so as to cover at least the entire display region. A predetermined potential shared by the picture elements is applied to the solid electrode 42.

The dielectric layer 43 is formed from a transparent insulating material. More specifically, the dielectric layer 42 is formed of an inorganic insulating film such as a silicon nitride film, or from an organic insulating film such as an acrylic resin film, or the like.

The dielectric constant of the dielectric layer 43 is about 6 to 7 in the case of using an inorganic material, and is about 3 to 4 in the case of using an organic material.

The film thickness of the dielectric layer 43 is 50 to 150 nm in the case of using an inorganic material, and is 1 to 3 nm in the case of using an organic material.

The solid electrode 42 and the dielectric layer 43 are provided at positions closer to the liquid crystal layer 3 than the color filter layer 41, and thus impurities from the color filter layer 41 can be prevented from being eluted to the liquid crystal layer 3. This arrangement improves credibility. Moreover, the surface on the liquid crystal layer 3 side of the counter substrate 2 can be planarized. Thus, generation of an insensitive region in the liquid crystal layer 3 can be suppressed. The insensitive region herein means a region less likely to be affected by the electric field caused by electrodes, specifically the solid electrode 42, and the pixel electrode 20 and the common electrode 30 that are described later. Furthermore, display with little image roughness and high contrast characteristics can be obtained. If irregularity exists in the boundary between the counter substrate 2 and the liquid crystal layer 3, the irregularity disturbs the electric field. Thus, the alignment of the nematic liquid crystal is disturbed, resulting in formation of unwanted domains. Moreover, if irregularity exists, the nematic liquid crystal is not perpendicularly aligned at the irregular part when no voltage is applied (during black display), and as a result, the contrast characteristic is deteriorated.

The active matrix substrate 1 includes a colorless transparent insulating substrate 10 formed from glass, plastic, or the like. As shown in FIG. 1, on a main surface on the liquid crystal layer 3 side of the insulating substrate 10, a plurality of signal lines (source bus lines) 11, a plurality of scanning lines (gate bus lines) 12, a plurality of storage capacitor lines 23, a plurality of thin film transistors (TFTs) 14, a plurality of pixel electrodes 20 individually provided to each picture element, and a common electrode 30 which is provided in common with the plurality of picture elements (for example, all picture elements) are provided. The TFTs 14 are switching elements (active elements) and are provided individually for each picture element.

With respect to a cross-sectional structure of the substrate 1, the scanning lines 12 and the storage capacitor lines 23 are provided on the insulating substrate 10. A gate insulating film (not shown) is provided on the scanning lines 12 and the storage capacitor lines 23. The signal lines 11 are provided on the gate insulating film. An interlayer insulating film 18 is provided on the signal lines 11. The electrodes 20 and 30 are provided on the interlayer insulating film 18. The vertical alignment film is provided on the electrodes 20 and 30.

The scanning lines 12 and the storage capacitor lines 23 are formed of a metal film having high melting points such as a molybdenum film and a tantalum film. The gate insulating film is formed of a transparent inorganic insulating film such as a silicon oxide film and a silicon nitride film. The signal lines 11 are formed of a low resistance metal film such as an aluminum film. The interlayer insulating film 18 is formed from transparent insulation materials, and the film thickness is about 3 µm. Specifically, the interlayer insulating film 18 is formed of an inorganic insulating film such as a silicon oxide film and a silicon nitride film, a transparent organic insulating film such as an acrylic resin film, or the like. The interlayer insulating film 18 may include a plurality of layers respectively formed from different materials from one another, or may be a laminate of an inorganic insulating film and an organic insulating film. The electrodes 20 and 30 are formed of a transparent conductive film such as an ITO film and an IZO film, a metal film such as an aluminum film and a chrome film, or the like.

The signal lines 11 are linearly provided in parallel to one another in a V-shaped zigzag pattern. More specifically, the signal lines 11 each have a planar shape in which a portion extending in a direction of 225° is connected to a portion extending in a direction of 315°. The width of the signal lines 11 is 3 µm. The scanning lines 12 are disposed linearly in parallel with one another, and extend in a left-right direction between adjacent picture elements. Each of regions separated by the signal lines 11 and the scanning lines 12 forms an approximately single picture element region. The signal lines 11 are connected to a source driver at an outside of the display region. The scanning lines 12 are connected to a gate driver at an outside of the display region and are connected to a gate electrode 24 of the TFTs 14 in the display region. The scanning lines 12 and the gate electrode 24 are formed of the same film by patterning, and thus they are connected to one another. Moreover, pulsed scanning signals are supplied at a predetermined timing from the gate driver to the scanning lines 12. The scanning signals are applied to the TFTs 14 by a line sequential system.

The TFTs 14 are provided in the neighborhoods of intersections of the signal lines 11 and the scanning lines 12, and each of the TFTs 14 includes a semiconductor layer formed in an island shape on the gate electrode 24. Also, the TFTs 14 each include the gate electrode 24, a source electrode 11a functioning as a source and a lower layer wiring (lower layer drain electrode) 13 functioning as a drain. The source electrode 11a connects the TFT 14 and the signal line 11. The lower layer wiring 13 connects the TFT 14 and the pixel electrode 20. The source electrode ha and the signal lines 11 are formed of the same film by patterning, and thus are connected to each other. The lower layer wiring 13 is provided on the gate insulating film in the same manner as the source electrode 11a and the signal lines 11, and is connected to the pixel electrode 20 through a contact hole 16 provided in the interlayer insulating film 18.

The lower layer wiring 13 includes a trunk portion formed in an island shape (lower layer trunk portion 13a) and a plurality of linear comb-tooth portions (lower layer comb-tooth portion 13b and 13c). The lower layer trunk portion 13a is provided in an island shape at the center of a picture element. The lower layer comb-tooth portions 13b and 13c are connected to the lower layer trunk portion 13a so as to be connected to each other. The lower layer comb-tooth portion 13b extends towards the upper side of the picture element from the center of the picture element, specifically, extends from the lower layer trunk portion 13a in a direction in an angle of approximately 45°. The lower comb-tooth portion 13c extends towards the lower side of the picture element from the center of the picture element, specifically, extends from the lower layer trunk portion 13a in a direction in an angle of approximately 315°. The lower layer comb-tooth portion 13c is connected to the TFT 14. The planar shape of the lower layer wiring 13 is approximately top-down symmetric. The lower layer trunk portion 13a and the lower layer comb-tooth portions 13b and 13c are formed of the same film by patterning, and thus are connected to one another.

The TFTs 14 enter an on state for only a fixed time period upon input of a scanning signal, and while the TFTs 14 are an on state, an image signal is supplied from the signal lines 11 at a predetermined timing to the pixel electrodes 20. Thereby, the image signal is written in the liquid crystal layer 3. Meanwhile, a predetermined potential that is common to the picture elements is applied to the common electrode 30.

After being written to the liquid crystal layer 3, the image signal is retained for a fixed time period between the pixel electrode 20 to which the image signal is supplied and the common electrode 30 facing the pixel electrode 20 and between the pixel electrode 20 and the solid electrode 42 facing the pixel electrodes 20. That is, a capacitance (liquid crystal capacitance) is formed for a fixed time period between the electrodes. In order to prevent leakage of the retained image signal, a storage capacitance is formed in parallel with the liquid crystal capacitance. The storage capacitance is formed in each picture element between the lower layer wiring 13 (especially lower layer trunk portion 13a) and the storage capacitor line 23. The storage capacitor line 23 is formed in parallel with the scanning line 12. The scanning line 12 and the storage capacitor line 23 are linearly formed in a left-right direction.

At times other than the time of black display, the voltage applied to the pixel electrode 20 is different from both of the voltage applied to the common electrode 30 and the voltage applied to the solid electrode 42.

The pixel electrode 20 has a comb shape in a plan view and includes an island-shaped trunk portion (pixel trunk portion 21) and a plurality of linear comb-tooth portions (pixel comb-tooth portions 22). The pixel trunk portion 21 is provided in an island shape at the center of the picture element. The pixel comb-tooth portions 22 are connected to the pixel trunk portion 21, and thereby they are connected to one another. A half the number of the pixel comb-tooth portions 22 extend towards the upper side of the picture element from the center of the picture element, specifically, extend from the pixel trunk portion 21 in a direction in an angle of approximately 45°. The rest half the number of the pixel comb-tooth portions 22 extend towards the lower side of the picture element from the center of the picture element, specifically, extend from the pixel trunk portion 21 in a direction in an angle of substantially 315°. The pixel electrode 20 is top-bottom down symmetry in a plan view. The pixel trunk portion 21 and the pixel comb-tooth portions 22 are formed of the same film by patterning, and thus are connected to one another.

The common electrode 30 includes a comb shape in a plan view, and has a trunk portion (common trunk portion 31) having a lattice shape (net shape) in a plan view and a plurality of linear comb-tooth portions (common comb-tooth portions 32). The common trunk portion 31 is formed in top-down and left-right directions to overlap the scanning lines 12 and the signal lines 11. The parts of the common trunk portion 31 which are overlapped with the signal lines 11 are formed in a zigzag pattern in directions in angles of 225° and 315°. Preferably, the common trunk portion 31 fully covers the scanning lines 12 and the signal lines 11. The common comb-tooth portions 32 are each connected to the common trunk portion 31. A half the number of the common comb-tooth portions 32 extend towards the center of the picture element from the upper side of the picture element, specifically, extend from a part of the common trunk portion 31 located at the upper side of the picture element in a direction in an angle of 225°. The rest half the number of the common comb-tooth portions 32 extend towards the center of the picture element from the lower side of the picture element, specifically, extend from a part of the common trunk portion 31 located at the lower side of the picture element in a direction in an angle of 135°. The planar shape of the common electrode 30 is top-down symmetry in each picture element. The common trunk portion 31 and the common comb-tooth portions 32 are formed of the same film by patterning, and thus are connected one another. The common comb-tooth portions 32 are connected to a part at which the common trunk portion 31 planarly overlaps the scanning lines 12.

Accordingly, the pixel electrode 20 and the common electrode 30 are disposed to face each other with the comb-tooth portions (pixel comb-tooth portions 22, common comb-tooth portions 32) of the respective electrodes engaging with each other. The pixel comb-tooth portions 22 and the common comb-tooth portions 32 are alternately disposed in parallel with each other with a spacing in between. Moreover, the pixel comb-tooth portions 22 are disposed in parallel with the parts of the common trunk portion 31 that overlap the signal lines 11. The signal lines 11, the pixel comb-tooth portions 22, the common comb-tooth portions 32, and the lower layer comb-tooth portions 13b and 13c are disposed in parallel with one another. The lower layer comb-tooth portion 13b, part of the signal lines 11, a half the number of the pixel comb-tooth portions 22, and a half the number of the common comb-tooth portions 32 are disposed in parallel with one another. The lower layer comb-tooth portion 13c, another part of the signal lines 11, the rest half the number of the picture comb-tooth portions 22, and the rest half the number of the common comb-tooth portions 32 are disposed in parallel with one another.

An angle formed by the signal lines 11 and the scanning lines 12 is not particularly limited and may be appropriately set. The angle is preferably 40° to 50°, and more preferably 45° as shown in FIG. 1 in terms of achieving good viewing angle characteristics.

The widths (minimum widths) of the pixel comb-tooth portions 22 and the common comb-tooth portions 32 are 2 to 5 μm (preferably 2 to 3 μm). The width exceeding 5 μm reduces the aperture ratio, which may deteriorate the transmittance. The width of less than 2 μm may reduce the yield due to defects such as disconnection. The width of the pixel comb-tooth portions 22 and that of the common comb-tooth portions 32 may be different from each other.

The present embodiment includes two regions where the lengths of the spacings between the pixel electrode 20 and the common electrode 30 are different from one another. The spacing between the pixel electrode 20 and the common electrode 30 means a spacing between the pixel electrode 20 and the common electrode 30 (hereinafter, also simply referred to as electrode spacing S) in a lateral direction (direction perpendicularly to the longitudinal direction) of the respective pixel comb-tooth portion 22 and the common comb-tooth portion 32. In each picture element, a region with a relatively narrow electrode spacing (spacing Sn region) and a region with a relatively wide electrode spacing (spacing Sw region) are formed. This arrangement allows each of the regions to have a different threshold of the VT characteristics from one another. Therefore, an inclination of the VT characteristics (VT curve) of the whole picture element can be smoothed especially at low gradation. As a result, occurrence of white floating can be reduced, and the viewing angle characteristics can be enhanced. Meanwhile, white floating refers to a phenomenon that, when a relatively dark low-gradation image is displayed, and the observing direction is inclined from the front view, the image that should be seen dark appears whitish.

The spacing Sn is, for example, 6 to 8 µm.

The spacing Sw is, for example, 8 to 10 µm.

Hereinafter, formation of two or more regions respectively having electrode spacings S of different lengths from one another in a picture element (pixel) is also referred to as formation of multi-space.

In the present embodiment as mentioned earlier, an oblique electric field (electric field that is oblique to the main surfaces of the respective substrates 1 and 2) is generated from the pixel electrode 20 to the solid electrode 42 when a voltage is applied. Moreover, a transverse electric field (electric field that is approximately parallel with the main surfaces of the respective substrates 1 and 2) is generated from the pixel electrode 20 to the common electrode 30. The transverse electric field functions to facilitate generation of the oblique electric field. Thus, due to the presence of the transverse electric field, the oblique electric field is not so much weakened even at a position away from the pixel electrode 20. Hence, the nematic liquid crystal that has been perpendicularly aligned when no voltage is applied is aligned in parallel with the oblique electric field when a voltage is applied.

In the case where the solid electrode 42 is adjacent to the vertical alignment film, equipotential lines are concentrated in a neighborhood of the boundary of the counter substrate 2 and the liquid crystal layer 3. For this reason, a component in a normal direction of the oblique electric field becomes strong in the liquid crystal layer 3. As a result, the nematic liquid crystal is not laid sufficiently in some cases. In contrast, in the present embodiment, since the dielectric layer 43 is provided on the liquid crystal layer 3 side of the solid electrode 42, it is possible to prevent the equipotential lines from being concentrated in a neighborhood of the boundary of the counter substrate 2 and the liquid crystal layer 3. Thus, the component in a normal direction of the oblique electric field in the liquid crystal layer 3 can be weakened. As a result, the nematic liquid crystal can be laid sufficiently, leading to enhancement of the transmittance of the entire picture element.

In the present embodiment, the lower layer wiring 13 (particularly, lower layer comb-tooth portions 13b and 13c) is provided on a layer that is lower than the common comb-tooth portions 32 in an overlapping manner, and further is extended along the common teeth portions 32. Therefore, an electric field generated due to the lower wiring 13 can be blocked by the common comb-tooth portions 32, and thereby it is possible to prevent the electric field from reaching the liquid crystal layer 3.

The width of the part of the lower layer wiring 13 (lower layer comb-tooth portions 13b and 13c) which is overlapped with the common comb-tooth portions 32 is substantially the same as the width of the common comb-tooth portions 32 (specifically, the width of the parts of the common comb-tooth portions 32 which are overlapped with the lower layer wiring 13). This makes it possible to prevent changes in the transmittance distribution between at a normal temperature and at a high temperature in the present embodiment that includes a multi-space formed therein. As a result, occurrence of flickers can be prevented.

The pixel electrode 20 has two kinds of pixel branch portions 22 which extend in directions orthogonally-crossing each other and the common electrode 30 has two kinds of the common branch portions 32 which extend in directions orthogonally-crossing each other. Moreover, two domains are formed in each kind of the pixel branch portions 22 and the common branch portions 32. Namely, the pixel electrode 20 has a first and a second pixel comb-tooth portions which extend in directions orthogonally-crossing each other, and the common electrode 30 has a first and a second common comb-tooth portions which extend in directions orthogonally-crossing each other. The first pixel comb-tooth portion and the first common comb-tooth portion form two domains, and the second pixel comb-tooth portion and the second common teeth-portion form other two domains. Accordingly, a total of four domains are formed in a picture element. This enables non-biased viewing angle compensation in all orientations, up, down, left and right.

An explanation follows below on simulation results of the transmittance in the cross-section shown in FIG. 2 using the same model as that in FIG. 2. As a simulator, Expert LCD (product of JEDAT INC.) was used.

The other simulation conditions are as follows:

Measurement temperature: 25° C. or 60° C.

Width $L_{22}$ of the pixel comb-tooth portion 22: 2.5 µm

Width $L_{32}$ of the common comb-tooth portion 32: 4 µm

Width $L_{31}$ of the common trunk portion 31: 10 µm

Width $L_{13b}$ of the lower layer comb-tooth portion 13b: 4 µm

Width $L_{11}$ of the signal line 11: 6 µm

Length of spacing Sw between the pixel comb-tooth portion 22 and the common comb-tooth portion 32: 8 µm Length of spacing Sn between the common trunk portion 31 and the pixel comb-tooth portion 22: 7 µm Voltage of the pixel electrode 20: AC (alternating current) voltage is applied (amplitude: 5.5 V); provided that the Vc (potential at the amplitude center) is set to the same potential as the potential of the common electrode 30

Voltage of the common electrode 30: DC (direct current) voltage −1 V is applied.

Voltage of the solid electrode 42: DC (direct current) voltage −1 V is applied.

Cell thickness d: 3.6 µm

Δn (25° C.): 0.12

Δn (60° C.): 0.1

Δ∈ (25° C.): 22

Δ∈ (60° C.): 11

Thickness of the dielectric layer 43: 2.0 µm

Dielectric constant ∈ of the dielectric layer 43: 3.7

Thickness of the interlayer insulating layer 18: 3.0 µm

Dielectric constant ∈ of the interlayer insulating layer 18: 3.7

Figure 3:
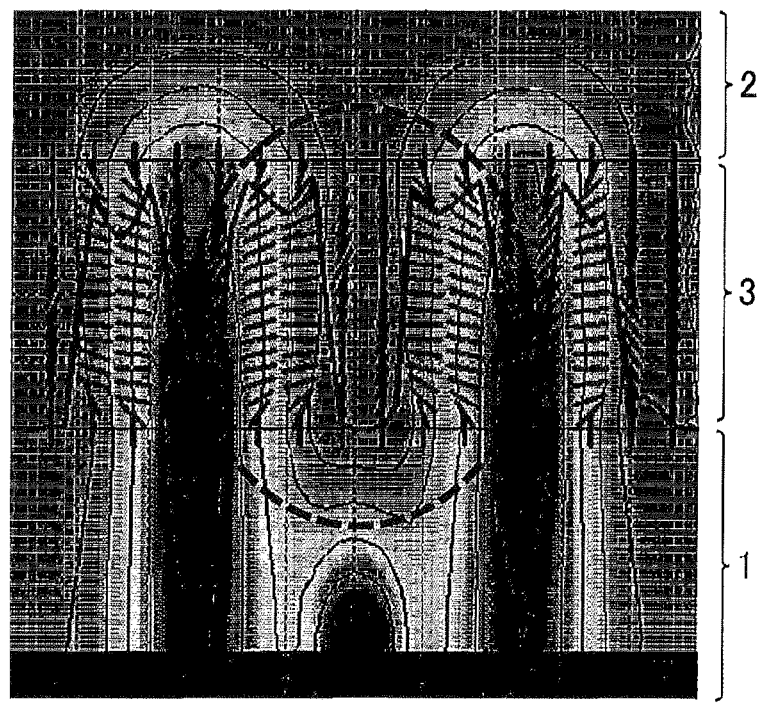
FIG. 3 is a view showing the result of measuring the transmittance at 25° C. of the liquid crystal display device according to Embodiment 1.
Figure 4:
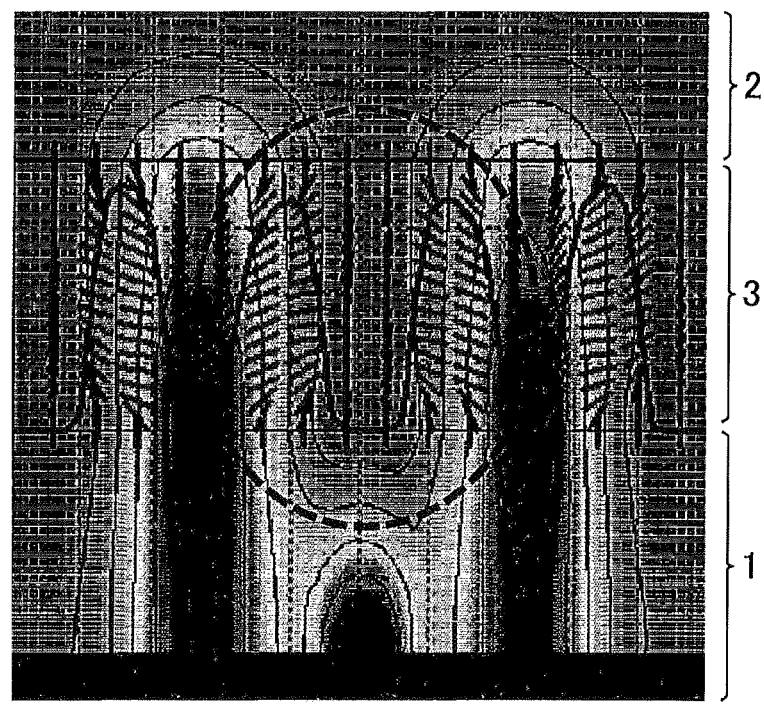
FIG. 4 is a view showing the result of measuring the transmittance at 60° C. of the liquid crystal display device according to Embodiment 1.

FIG. 3 shows the results obtained at a temperature of 25° C., and FIG. 4 shows the results obtained at a temperature of 60° C. In FIGS. 3 and 4, the transmittance distribution is shown by a bold solid line. FIGS. 3 and 4 also show equipotential lines and liquid crystal directors as well as the transmittance.

As shown in FIGS. 3 and 4, in the present embodiment, change in the transmittance distribution accompanying the temperature change is small. Therefore, it is confirmed that flicker can be prevented from occurring.

Compared with Comparative Embodiment to be described below, the present embodiment can reduce loss in the transmittance, enabling low energy consumption.

Meanwhile, at the part having the lower layer comb-tooth portion 13c, the same result as that obtained at the part having the lower layer comb-tooth portion 13b can be obtained.

Figure 15:
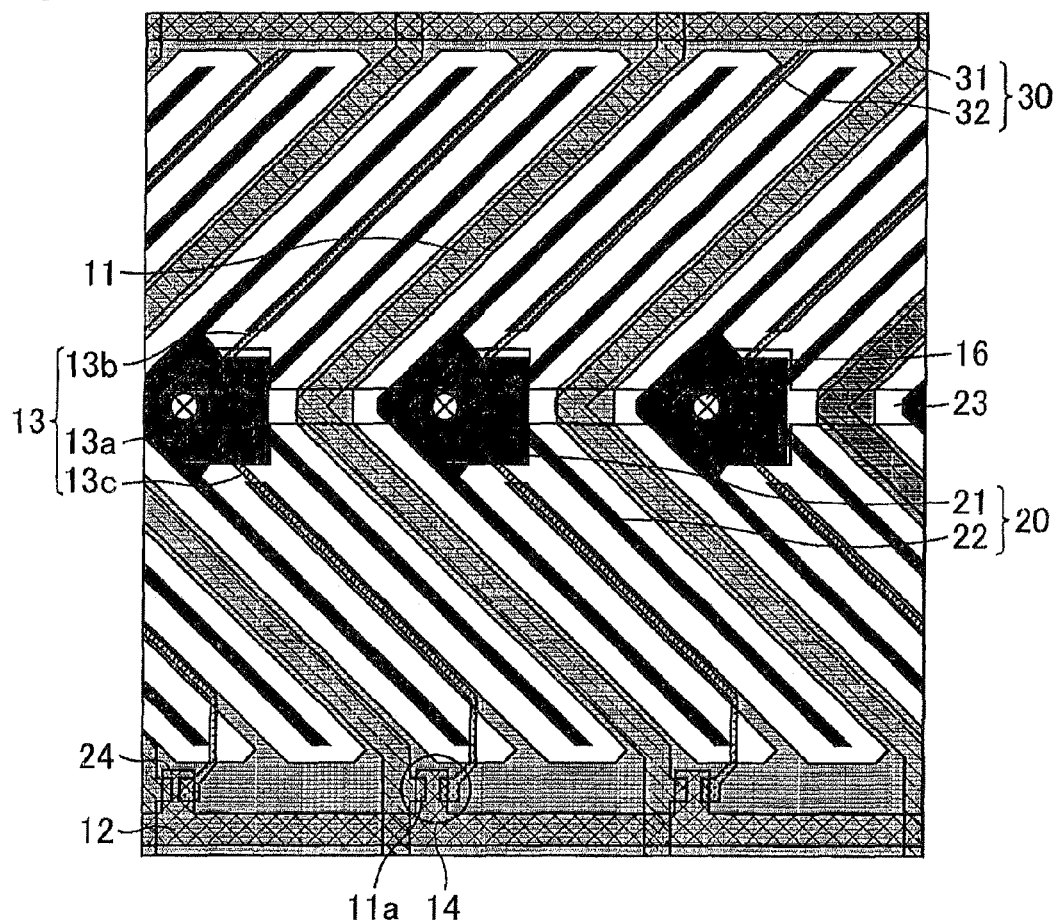
FIG. 15 is a schematic plan view showing a modified example of the liquid crystal display device according to Embodiment 1.

As shown in FIG. 15, in the present embodiment, the width of the part (lower layer comb-tooth portions 13b and 13c) of the lower layer wiring 13 which is overlapped with the common comb-tooth portions 32 may be smaller than the width of the common comb-tooth portions 32 (specifically the width of the parts of the common comb-tooth portions 32 which are overlapped with the lower layer wiring 13). This arrangement can also prevent changes in the transmittance distribution between at a normal temperature and at a high temperature. As a result, flicker can be prevented from occurring.

(Embodiment 2)

Figure 5:
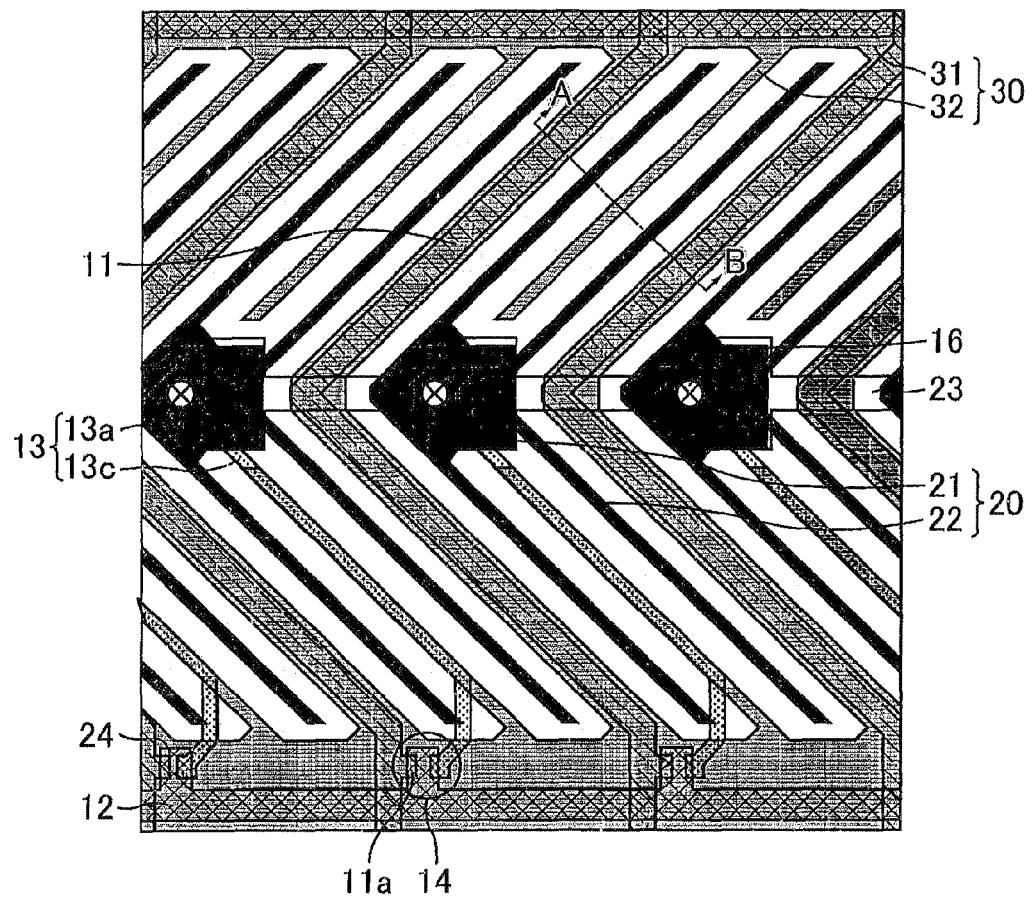
FIG. 5 is a schematic plan view showing a liquid crystal display device according to Embodiment 2.
Figure 6:
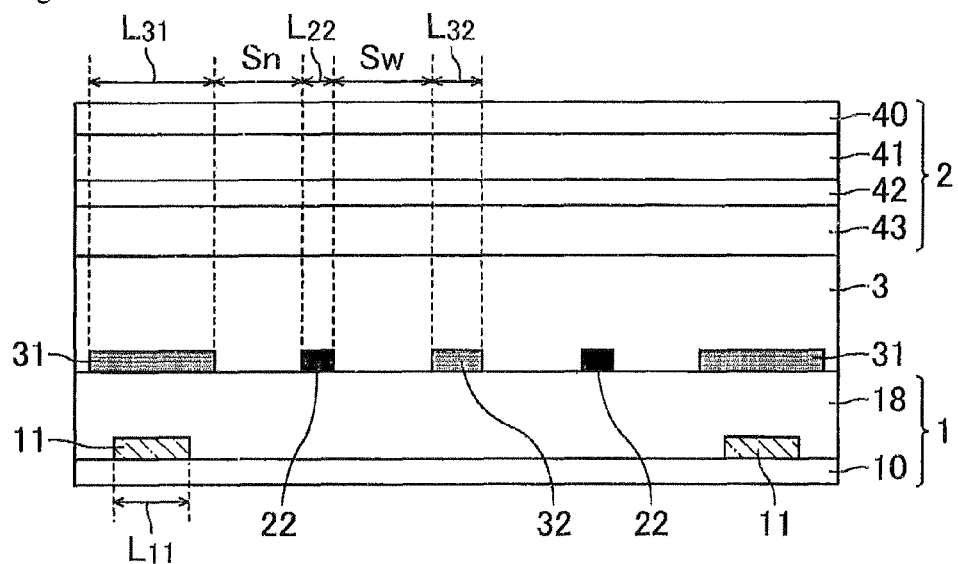
FIG. 6 is an A-B line cross-sectional view of FIG. 5.

As shown in FIGS. 5 and 6, a liquid crystal display device of Embodiment 2 has the same structure as that of the liquid crystal display device of Embodiment 1, except that the liquid crystal display device of present embodiment does not include the lower layer comb-tooth portion 13b.

An explanation follows below on simulation results of the transmittance using the model shown in FIG. 6. FIG. 6 shows an A-B line cross section of the liquid crystal display device of FIG. 5. The simulation was performed under the same conditions of Embodiment 1, except that the lower layer comb-tooth portion 13b was not provided.

Figure 7:
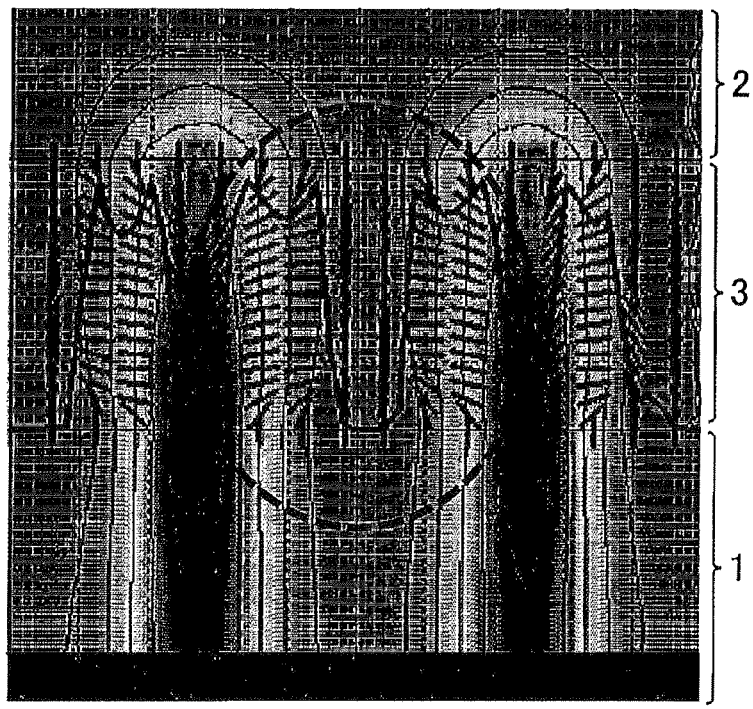
FIG. 7 is a view showing the result of measuring the transmittance at 25° C. of the liquid crystal display device according to Embodiment 2.
Figure 8:
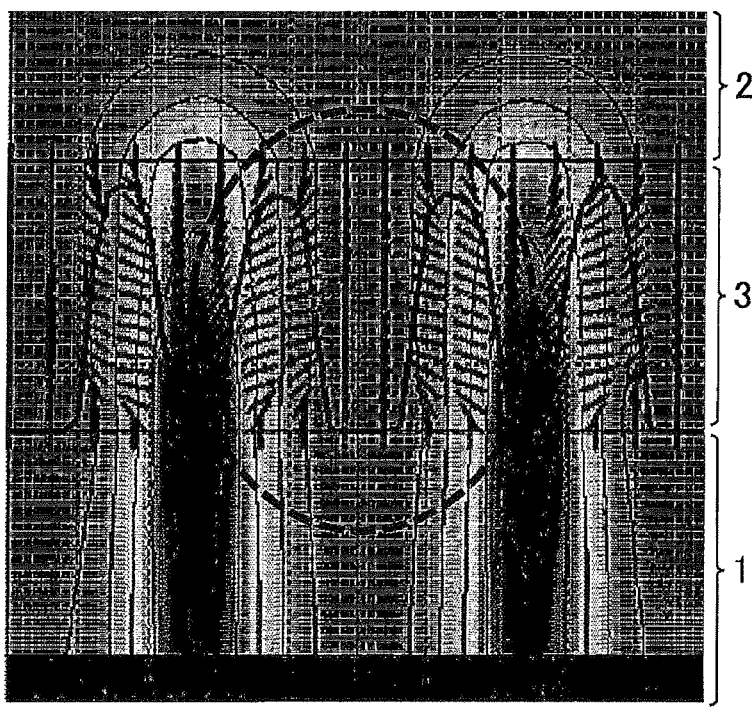
FIG. 8 is a view showing the result of measuring the transmittance at 60° C. of the liquid crystal display device according to Embodiment 2.

FIG. 7 shows the results obtained at a temperature of 25° C., and FIG. 8 shows the results obtained at a temperature of 60° C. In FIGS. 7 and 8, the transmittance distribution is shown by a bold solid line. FIGS. 7 and 8 also show equipotential lines and liquid crystal directors as well as the transmittance.

As shown in FIGS. 7 and 8, in the present embodiment, change in the transmittance distribution accompanying the temperature change is small. Therefore, it is confirmed that flicker can be prevented from occurring.

Compared with a comparative embodiment to be described below, the present embodiment can reduce loss in the transmittance, enabling low energy consumption.

Meanwhile, at the part having the lower layer comb-tooth portion 13c, the same result as that obtained in Embodiment 1 can be obtained.

Figure 16:
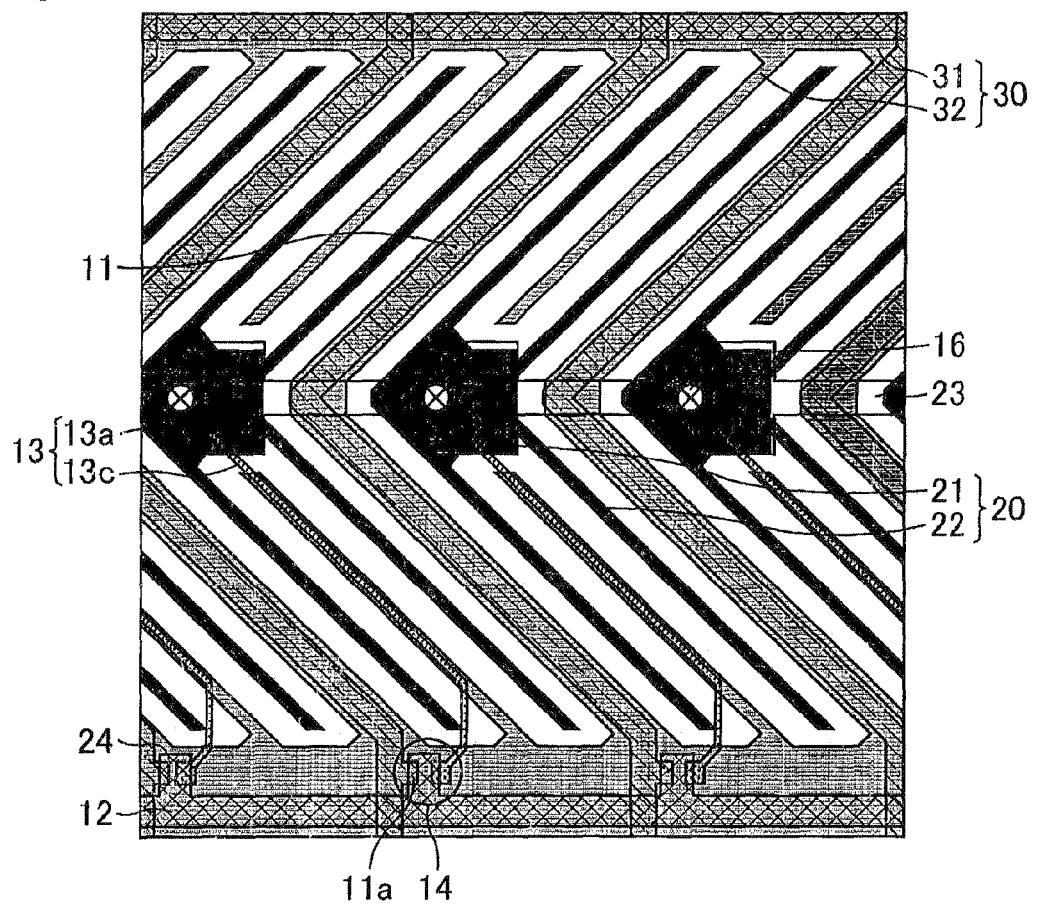
FIG. 16 is a schematic plan view showing a modified example of the liquid crystal display device according to Embodiment 2.

As shown in FIG. 16, in the present embodiment, the width of the part (lower layer comb-tooth portion 13c) of the lower layer wiring 13 which is overlapped with the common comb-tooth portions 32 may be smaller than the width of the common comb-tooth portions 32 (specifically the width of the parts of the common comb-tooth portions 32 which are overlapped with the lower layer wiring 13). This arrangement can also prevent changes in the transmittance distribution between at a normal temperature and at a high temperature. As a result, flickers can be prevented from occurring.

As shown in FIGS. 1, 5, 15, and 16, in Embodiments 1 and 2, the part of the lower layer wiring 13 which is overlapped with the common comb-tooth portions 32 is disposed so as not to protrude from the common comb-tooth portions 32.

Meanwhile, in Embodiments 1 and 2, the number of the domains formed in a picture element is not particularly limited, and for example may be two.

Moreover, in Embodiments 1 and 2, the number of the region having electrode spacings S of different lengths from one another in a picture element is not particularly limited, and may be three or more. In the case of the number of the regions of three or more, as in the case where the number is two, occurrence of white floating can be reduced, and the viewing angle characteristics can be enhanced.

(Comparative Embodiment 1)

Figure 9:
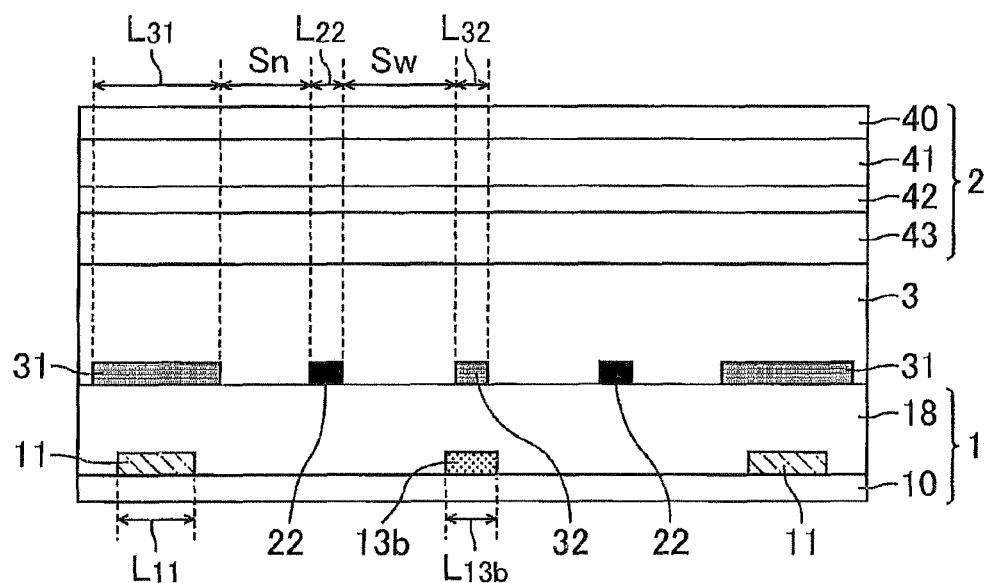
FIG. 9 is a schematic cross-sectional view showing a liquid crystal display device according to Comparative Embodiment 1.

As shown in FIG. 9, a liquid crystal display device of Comparative embodiment 1 has the same structure as that of the liquid crystal display device of Embodiment 1, except that the width of the part of the lower layer wiring 13 which is overlapped with the common comb-tooth portions 32 is larger than the width of the parts of the comb-tooth portions 32 which are overlapped with the lower layer wiring 13.

An explanation follows below on simulation results of the transmittance in the cross-section in FIG. 9 using the model shown in FIG. 9. The model is the same as one used in Embodiment 1, except that the width $L_{32}$ of the common comb-tooth portions 32 was 2.5 μm, and the length of the spacing Sw between the pixel comb-tooth portion 22 and the common comb-tooth portion 32 was 9.5 μm. Namely, the width $L_{13b}$ of the lower layer comb-tooth portion 13b is larger than the width $L_{32}$ of the common comb-tooth portion 32. The other conditions for simulation are the same as those in Embodiment 1.

Figure 10:
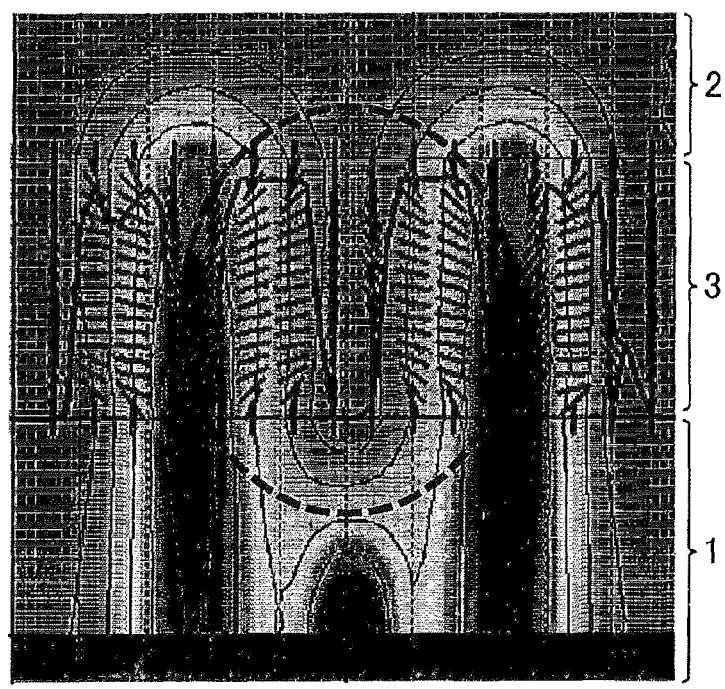
FIG. 10 is a view showing the result of measuring the transmittance at 25° C. of the liquid crystal display device according to Comparative Embodiment 1.
Figure 11:
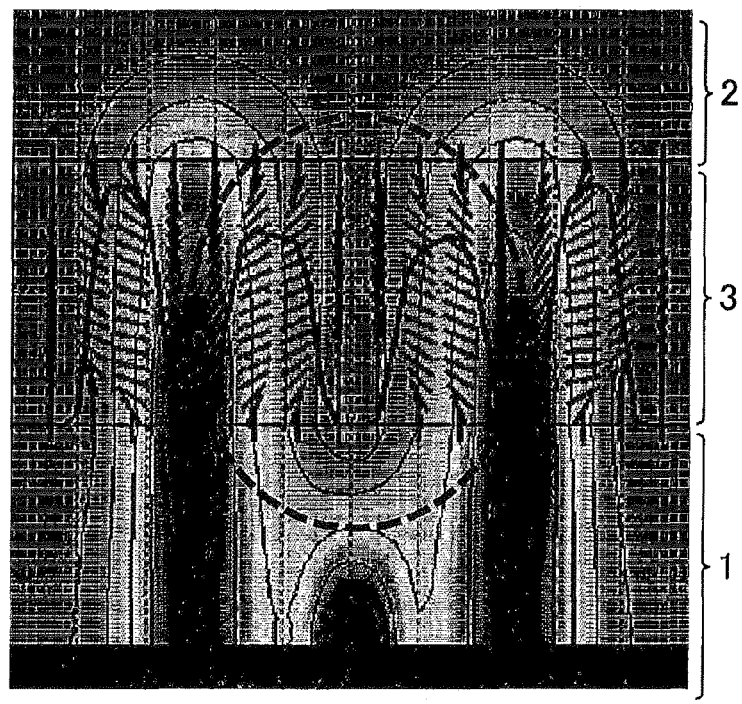
FIG. 11 is a view showing the result of measuring the transmittance at 60° C. of the liquid crystal display device according to Comparative Embodiment 1.
Figure 12:
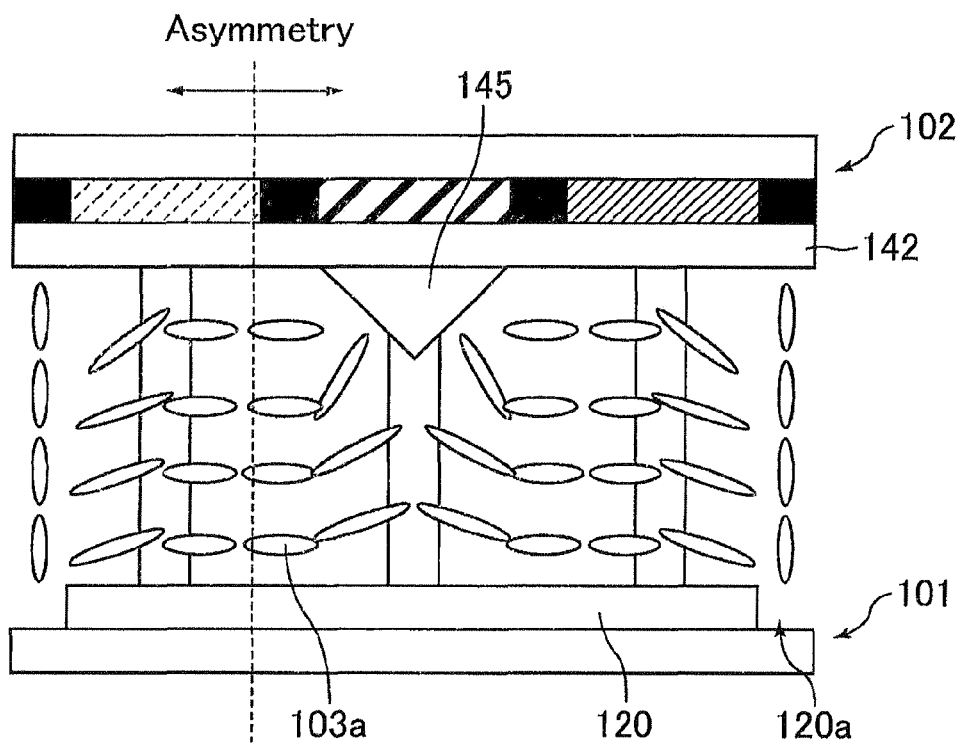
FIG. 12 is a schematic cross-sectional view showing a conventional liquid crystal display device of MVA mode.
Figure 13:
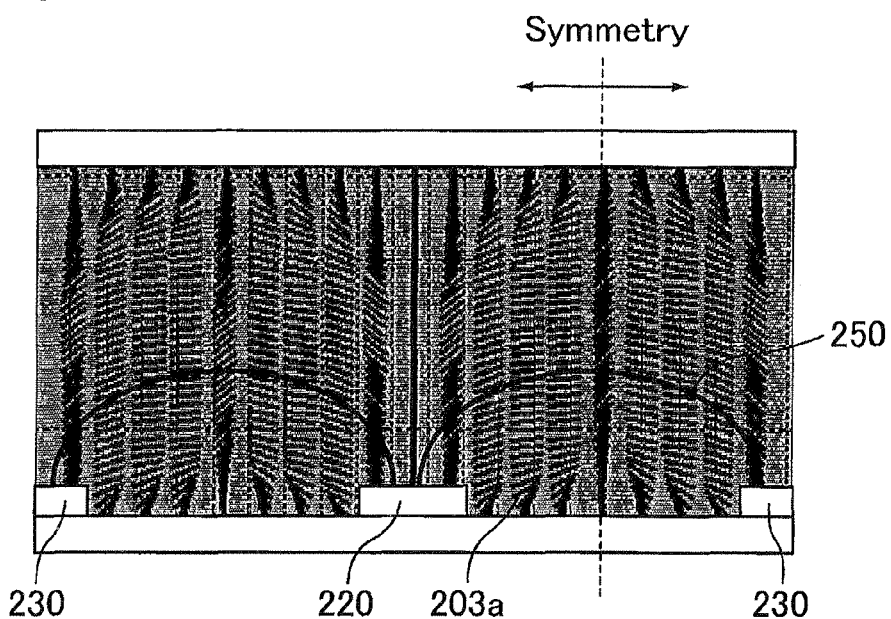
FIG. 13 is a schematic cross-sectional view showing a conventional liquid crystal display device.
Figure 14:
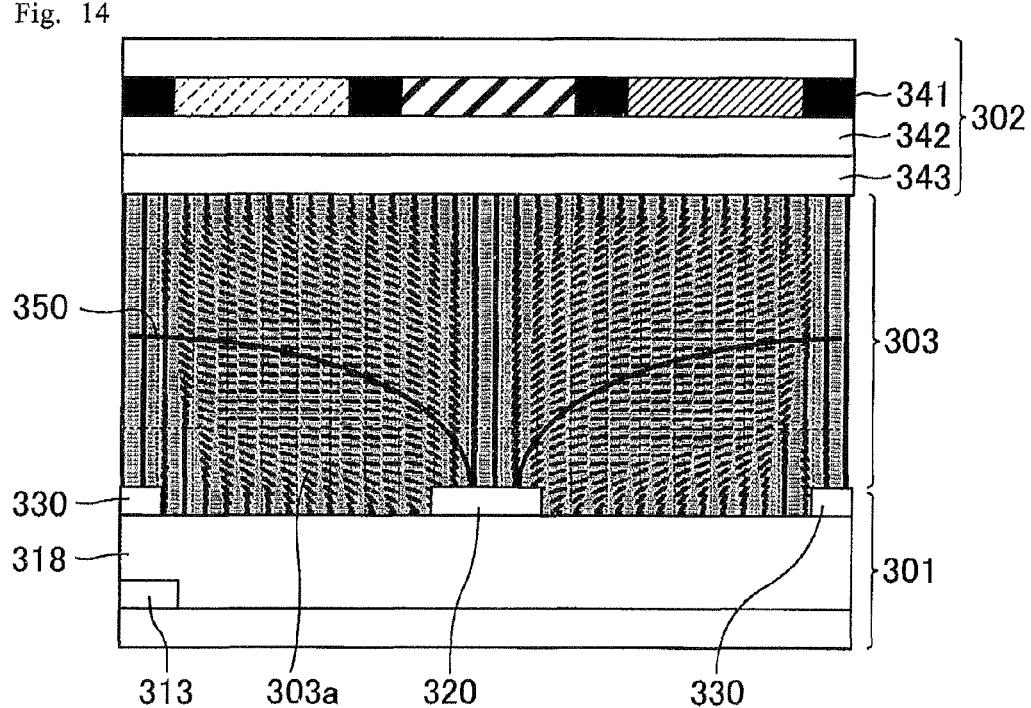
FIG. 14 is a schematic cross-sectional view showing a liquid crystal display device according to Comparative Embodiment.

FIG. 10 shows the results obtained at a temperature of 25° C., and FIG. 11 shows the results obtained at a temperature of 60° C. In FIGS. 10 and 11, the transmittance distribution is shown by a bold solid line. FIGS. 10 and 11 also show equipotential lines and liquid crystal directors as well as the transmittance.

As shown in FIGS. 10 and 11, in the Comparative Embodiment, change in the transmittance distribution accompanying the temperature change is large. Therefore, flicker may occur. This is because the through-feed voltage differs from one domain to another, and thus optimal voltage to be applied to the common electrode 30 differs from one domain to another.

In the Comparative Embodiment, loss in the transmittance was larger than those in Embodiments 1 and 2.

The present application claims priority to Patent Application No. 2010-3218 filed in Japan on Jan. 8, 2010 under the Paris Convention and provisions of national law in a designated State, the entire contents of which are hereby incorporated by reference.

REFERENCE SIGNS LIST

1: Active matrix substrate
2: Counter substrate
3: Liquid crystal layer
10, 40: Insulating substrate
11: Signal line
11a: Source electrode
12: Scanning line
13: Lower layer wiring
13a: Lower layer trunk portion
13b, 13c: Lower layer comb-tooth portion
14: TFT
16: Contact hole
18: Interlayer insulating film
20: Pixel electrode
21: Pixel trunk portion
22: Pixel comb-tooth portion
23: Storage capacitor line
24: Gate electrode
30: Common electrode
31: Common trunk portion
32: Common comb-tooth portion
41: Color filter layer
42: Solid electrode
43: Dielectric layer

The invention claimed is:

1. A liquid crystal display device comprising
a first substrate and a second substrate disposed to face each other, and
a liquid crystal layer sandwiched between the first substrate and the second substrate, wherein
the liquid crystal layer includes a liquid crystal molecule having positive dielectric anisotropy;
the liquid crystal molecule is perpendicularly aligned relative to a surface of the first substrate when no voltage is applied, and has a dielectric constant $\Delta\in$ of 15 to 25;

the first substrate includes a pixel electrode to which an image signal is supplied, a common electrode to which a common signal is supplied, an insulating film, and a lower layer wiring connected to the pixel electrode;

the lower layer wiring, the insulating film, and the common electrode are stacked in the stated order towards the liquid crystal layer side;

the image signal is supplied to the pixel electrode through the lower wiring;

the pixel electrode includes a pixel comb-tooth portion;

the common electrode includes a common comb-tooth portion;

the pixel comb-tooth portion and the common comb-tooth portion are planarly disposed to face each other in a pixel;

the liquid crystal device includes at least two regions including spacings of different lengths between the pixel electrode and the common electrode from each other in the pixel;

the lower layer wiring overlaps the common comb-tooth portion and extends along the common comb-tooth portion;

a width of a part of the lower layer wiring which is overlapped with the common comb-tooth portion is substantially the same as or smaller than a width of a part of the common comb-tooth portion which is overlapped with the lower layer wiring; and the second substrates include a color filter layer, a solid electrode and a dielectric layer; and wherein the solid electrode and the dielectric layer are provided at positions closer to the liquid crystal layer than the color filter layer.

2. The liquid crystal display device according to claim 1, wherein the dielectric constant $\Delta\in$ is 18 22.

3. The liquid crystal display device according to claim 1, wherein widths of the pixel comb-tooth portion and the common comb-tooth portion are 2 to 5 μm.

* * * * *

UNITED STATES PATENT AND TRADEMARK OFFICE
CERTIFICATE OF CORRECTION

| | | |
|---|---|---|
| PATENT NO. | : 8,860,916 B2 | Page 1 of 1 |
| APPLICATION NO. | : 13/521110 | |
| DATED | : October 14, 2014 | |
| INVENTOR(S) | : Murata et al. | |

It is certified that error appears in the above-identified patent and that said Letters Patent is hereby corrected as shown below:

On the Title Page Item (30) Foreign Application Priority Data

Please correct the country code for Japan as shown below:

Jan. 8, 2010 --(JP)-- ...... 2010-003218.

Signed and Sealed this
Tenth Day of March, 2015

Michelle K. Lee
*Deputy Director of the United States Patent and Trademark Office*